Nov. 24, 1942.   S. A. AXELRAD   2,302,830
MICROSCOPE TEST SLIDE
Filed Oct. 30, 1940

INVENTOR.
SOL A. AXELRAD
BY
ATTORNEY

Patented Nov. 24, 1942

2,302,830

UNITED STATES PATENT OFFICE 2,302,830

MICROSCOPE TEST SLIDE

Sol A. Axelrad, New York, N. Y.

Application October 30, 1940, Serial No. 363,403

2 Claims. (Cl. 88—40)

The invention relates to microscope test slides used in medical diagnoses and more particularly to slides for use in the Kline flocculation test for the diagnosis and exclusion of syphilis, and for other agglutination tests. In conducting the aforesaid Kline test it has heretofore been proposed to use microscope slides provided with a plurality of paraffin rings located in predetermined arrangement on a surface of said slides. Such slides require the paraffin rings to be removed after each test and new paraffin rings to be formed on the slides prior to the next test, which is costly in both time and labor. In addition after each test the making of the paraffin rings is more or less difficult and quite messy, and the slides must be thoroughly and properly cleaned so that no film of paraffin will remain on the slide to interfere with the mixing of the serum with antigen. It has further been proposed to use glass slides provided with a plurality of concavities or recesses of curved form in cross-section. With such curved surfaces proper coagulation does not always take place and even if it does, may give unreliable results as by indicating a positive reaction instead of a correct negative reaction. Furthermore with the aforesaid curved surfaces the fluid must cover an extended area and results in less concentration than is required for efficient and reliable results.

The instant invention has for its object the provision of a glass slide in which the aforesaid objections and disadvantages are overcome and which insures as accurate results as possible. The invention contemplates primarily a glass slide provided on one surface with a predetermined number of integral glass ribs or ridges of accurately predetermined diameters and height above said surface of the slide whereby effective concentration of serum and antigen is assured and whereby the fluid will be effectively confined in individual amounts consistent with proper flocculation so that the tests will always be as accurate as possible and the results thereof always be as reliable as possible. Other objects will appear from the description hereinafter and the features of novelty will be pointed out in the claims.

Figure 1:
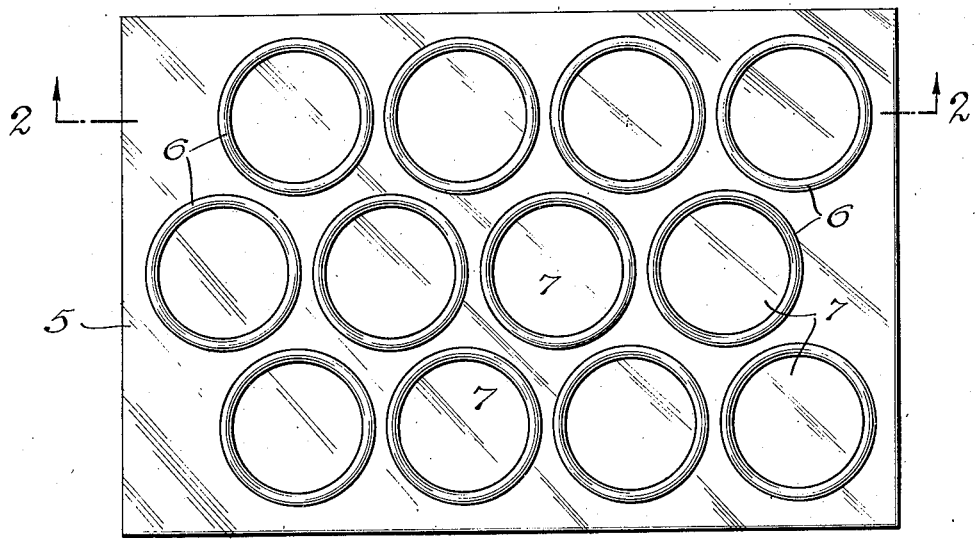
Figure 2:
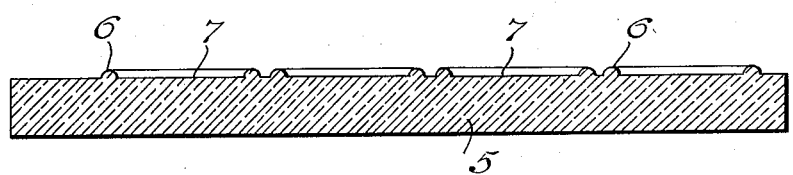

In the accompanying drawing which illustrates an example of the invention without defining its limits, Fig. 1 is a face view of the novel slide, and Fig. 2 is a sectional view on the line 2—2 of Fig. 1.

The slide comprises a flat plate of glass 5 or other material such as plastics including synthetic resins, of predetermined thickness and dimensions dependent upon the type of test for which it is designed. In the form intended for use in connection with the Kline flocculation test, the slide is preferably 3" x 2" in size and of rectangular form. From practical experience it has been found that the thickness of the slide may vary from 1 mm. up to 7 or 8 mm., but an efficient and satisfactory thickness has been found to be between 2 and 4 mm. For the Kline flocculation test the slide is preferably made of transparent glass. The one flat face of the slide is provided with a plurality of annular ribs or ridges 6 produced in any convenient manner as integral parts of said slide as shown in Fig. 2. The annular ribs 6 are located preferably on one face of the slide in any suitable arrangement to provide groups of circular recesses 7 defined by said ribs 6 and having the flat face of the plate 5 as flat bottoms. In slides designed for the Kline flocculation test twelve annular ribs 6 are located in three parallel rows with the circular recesses formed by said ribs 6 in registry with each other in all directions, or with the recesses of the center row in staggered relation to the recesses of the adjacent rows as illustrated in Fig. 1; it will be understood that other arrangements of said recesses may be utilized if found desirable.

The inside diameters of the annular ribs 6 and the height of the latter above the surfaces of the glass plate 5 are both of importance particularly in the case of slides designed for the aforesaid Kline test. If the inside diameter of the ribs 6 is not properly calculated there may be either too much or too little concentration of serum and antigen. Similarly the ribs 6 must be of the proper height above the surface of the glass plate 5 to secure the desired and most efficient results; that is to say if the ribs 6 are too low the fluid from one circular recess may run over into a contiguous recess, while if said ribs are too high then there is too much glass in contact with the serum and this, in the case of the Kline test may cause improper flocculation. In practice the most efficient results are obtained at least with the hereinbefore mentioned Kline test, with annular ribs 6 varying in height from ¾ to 1½ mm. and having an inside diameter of 14 mm. in diameter and with .05 cc. serum contained in each circular recess and forming the desired film of serum therein. The Kline test is based on a recess of 14 mm. diameter, and it can be readily understood, if the diameter of the recess is made smaller or larger than 14 mm. that the tests may be inaccurate and give incorrect results because of the fact that only .05 cc. serum is used in each recess.

The annular ribs 6 of a given slide may be numbered from one to twelve, or they may be numbered in pairs from one up to six. In cases where more than six tests are being made at a given time, the slides may be used as sections in the same slide holder. For example, two slides may be combined to run twelve tests, or three plates may be combined to run eighteen tests, etc.

The dimensions of the ribs 6 as to height and inner diameter recited above are critical in connection with slides designed for the Kline test, but may be varied in slides intended for other tests. In other words, the novel slide and similar slides with annular ribs 6 of either smaller or larger diameters than those indicated, and of greater or less height than mentioned above may be used with equal efficiency for other tests such as the Widal typhoid agglutination, blood grouping, urine microscopics, etc.

In all cases the novel slides will give as accurate and reliable results as possible for the tests, it being understood that said slides are used in the microscope in any conventional manner. The novel slides are at all times ready for use and except for conventional cleaning to remove foreign matter require no special treatment. The necessity for removing paraffin rings from the slides subsequent to each test and the production of new paraffin rings thereon prior to later tests, as is now necessary is entirely avoided and the disadvantages inherent in such slides and other existing tyes of slides are also overcome. Furthermore the production of the novel slides may be effected in a comparatively simple manner in a minimum of time and at minimum expense.

Various materials may be used for the slides in place of glass such as transparent plastics, like the transparent resins sold under the name "Lucite."

Although the present invention has been described in conjunction with a preferred embodiment, it is to be understood that modifications and variations may be resorted to without departing from the spirit and scope of the invention, as those skilled in the art will readily understand. Thus it will be observed that in place of the Kline flocculation test, the novel slides may be used for other slide tests such as for instance those mentioned hereinbefore. Such variations and modifications are considered to be within the purview and scope of the appended claims.

I claim:

1. A microscope slide comprising a glass plate of predetermined thickness and having opposite flat surfaces in parallel planes, and an annular glass rib projecting upwardly from one of said surfaces as an integral part thereof, said rib having a selective height ranging from ¾ to 1½ mm. and a predetermined inner diameter to define a relatively shallow circular recess having said surface of said plate as a flat bottom for receiving and confining a predetermined quantity of specimen fluid therein in the form of a uniform film for microscopic examination.

2. A microscope slide for use in connection with the Kline flocculation test, comprising a transparent glass plate of predetermined thickness having opposite flat surfaces in parallel planes, and a plurality of annular glass ribs projecting upwardly from one of said surfaces as integral parts thereof, said ribs each having a selective height ranging from ¾ to 1½ mm. and each having an inner diameter of approximately 14 mm. to define a plurality of relatively shallow circular recesses having said surface of said plate as a common flat bottom for receiving predetermined relatively small quantities of fluid on said flat surface of said plate amounting to approximately .05 cc. in each recess and confining said relatively small quantities of specimen fluid on said plate surface in the form of independent uniform films for microscopic examination.

SOL A. AXELRAD.